US009865273B2

(12) United States Patent
Won et al.

(10) Patent No.: US 9,865,273 B2
(45) Date of Patent: Jan. 9, 2018

(54) TANGIBLE MULTIMEDIA CONTENT PLAYBACK METHOD AND APPARATUS

(71) Applicant: Samsung Electronics Co., Ltd., Gyeonggi-do (KR)

(72) Inventors: Sungjoon Won, Gyeonggi-do (KR); Sehee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/595,705

(22) Filed: Jan. 13, 2015

(65) Prior Publication Data
US 2015/0199975 A1    Jul. 16, 2015

(30) Foreign Application Priority Data
Jan. 13, 2014  (KR) ......................... 10-2014-0003755

(51) Int. Cl.
| | |
|---|---|
| G10L 19/00 | (2013.01) |
| G10L 19/02 | (2013.01) |
| H04N 21/81 | (2011.01) |
| H04N 21/8547 | (2011.01) |

(52) U.S. Cl.
CPC ......... *G10L 19/02* (2013.01); *H04N 21/8146* (2013.01); *H04N 21/8547* (2013.01)

(58) Field of Classification Search
CPC ....... G10L 15/22; G10L 15/265; G06F 3/167; H04M 2201/40
USPC ........................................................ 704/275
See application file for complete search history.

(56) References Cited

U.S. PATENT DOCUMENTS

| | | | | |
|---|---|---|---|---|
| 6,925,197 | B2* | 8/2005 | Dimitrova | G06F 17/30793 348/61 |
| 2002/0194199 | A1* | 12/2002 | Flank | G06F 17/30253 |
| 2007/0220045 | A1* | 9/2007 | Morris | G06F 17/30038 |
| 2007/0250901 | A1* | 10/2007 | McIntire | H04N 7/17318 725/146 |
| 2009/0138906 | A1* | 5/2009 | Eide | G06F 17/30038 725/32 |
| 2011/0319180 | A1* | 12/2011 | Lee | A47C 1/121 472/75 |
| 2012/0127268 | A1 | 5/2012 | Yun et al. | |
| 2013/0014184 | A1 | 1/2013 | Mank | |
| 2014/0165105 | A1* | 6/2014 | Mountain | H04N 21/42203 725/46 |

FOREIGN PATENT DOCUMENTS

| | | |
|---|---|---|
| CN | 102543118 | 7/2012 |
| CN | 102724522 | 10/2012 |
| JP | 2002204891 | 7/2002 |

OTHER PUBLICATIONS

European Search Report dated Mar. 19, 2015 issued in counterpart application No. 15150894.2-1908.

* cited by examiner

*Primary Examiner* — Jesse Pullias
(74) *Attorney, Agent, or Firm* — The Farrell Law Firm, P.C.

(57) ABSTRACT

A tangible multimedia content playback method and apparatus is provided. The tangible multimedia content playback method includes extracting effect data from multimedia content, mapping the extracted effect data to a timeline of the multimedia content, establishing, when the multimedia content is played, a connection to at least one peripheral device pertaining to the effect data, and controlling the at least one peripheral device pertaining to the effect data to match with the timeline.

17 Claims, 9 Drawing Sheets

FIG. 2B

```xml
<?xml version="1.0" encoding="UTF-8"?>
<stream id='0'>
    <effect type='interactive'>
        <start_time> 00:05:11 </start_time>
        <end_time> 00:05:20 </end_time>
        <service type='forum.upnp.org/telephony'>
            <sending_signal id='0' type='action'>
                <name> SEND_MESSAGE</name>
                <argument name='msg'>WATCH OUT!</argument>
            </sending_signal>
            <receiving_signal id='0' type='eventing'>
                <name> STATUS</name>
                <value> MESSAGE_READ</value>
            </receiving_signal>
            <max_waiting_time>00:00:05</max_waiting_time>
        </service>
        <av_control>
            <state> PAUSE </state>
            <stream type='audio' id='5'/>
            <stream type='caption' id='10'/>
            <next_state> PLAY </next_state>
        </av_control>
    </effect>
</stream>
```

<710>

<720>

TANGIBLE MULTIMEDIA CONTENT PLAYBACK METHOD AND APPARATUS

PRIORITY

This application claims priority under 35 U.S.C. §119(a) to Korean Patent Application No. 10-2014-0003755, filed on Jan. 13, 2014, the entire content of which is incorporated herein by reference.

BACKGROUND

1. Field of the Invention

The present invention generally relates to a method and apparatus for playing multimedia content efficiently.

2. Description of the Related Art

With the advance of technologies, multimedia contents (such as TV shows, movies, and other video files) which can be played through a television (TV) or a computer now can be played on a mobile phone and a tablet Personal Computer (PC). Also, a 4-Dimensional (4D) movie theater is designed to provide a virtual reality environment similar to that in the scene of the multimedia contents such that the user feels as if she/he is in the scene as a character in the multimedia contents. For example, the 4D movie theater creates a stereoscopic environment with rain, wind, flash, and vibration effects using moving chairs, a large number of speakers, and lighting apparatuses.

However, most users use televisions, computers, or mobile devices more often to watch video contents than go to the theaters to watch movies. Also, the user usually watches videos using a mobile device while moving. In this case, the user watches the video content without a virtual reality environmental experience that can be provided by the 4D movie theater.

SUMMARY

The present invention has been made to solve at least the above-mentioned problems and/or disadvantages and to provide at least the advantages described below.

In accordance with an aspect of the present invention, a tangible multimedia content playback method is provided. The tangible multimedia content playback method includes extracting effect data from multimedia content, mapping the extracted effect data to a timeline of the multimedia content, establishing, when the multimedia content is played, a connection to at least one peripheral device pertaining to the effect data, and controlling the at least one peripheral device pertaining to the effect data to match with the timeline.

In accordance with another aspect of the present invention, a tangible multimedia content playback apparatus is provided. The tangible multimedia content playback apparatus includes an input unit configured to receive an input of multimedia content, a communication unit configured to establish connections with peripheral devices proving effects corresponding to the effect data mapped to a selected multimedia content, and a control unit configured to establish connections among the peripheral devices and to control the peripheral devices corresponding to the effect data to match with a timeline of the multimedia content.

BRIEF DESCRIPTION OF THE DRAWINGS

The above and other aspects, features, and advantages of certain embodiments of the present invention will be more apparent from the following detailed description taken in conjunction with the accompanying drawings, in which:

FIGS. 2A and 2B are diagrams for explaining extraction of effect data in a tangible multimedia content playback method according to an embodiment of the present invention;

DETAILED DESCRIPTION OF EMBODIMENTS OF THE PRESENT INVENTION

Figure 1:
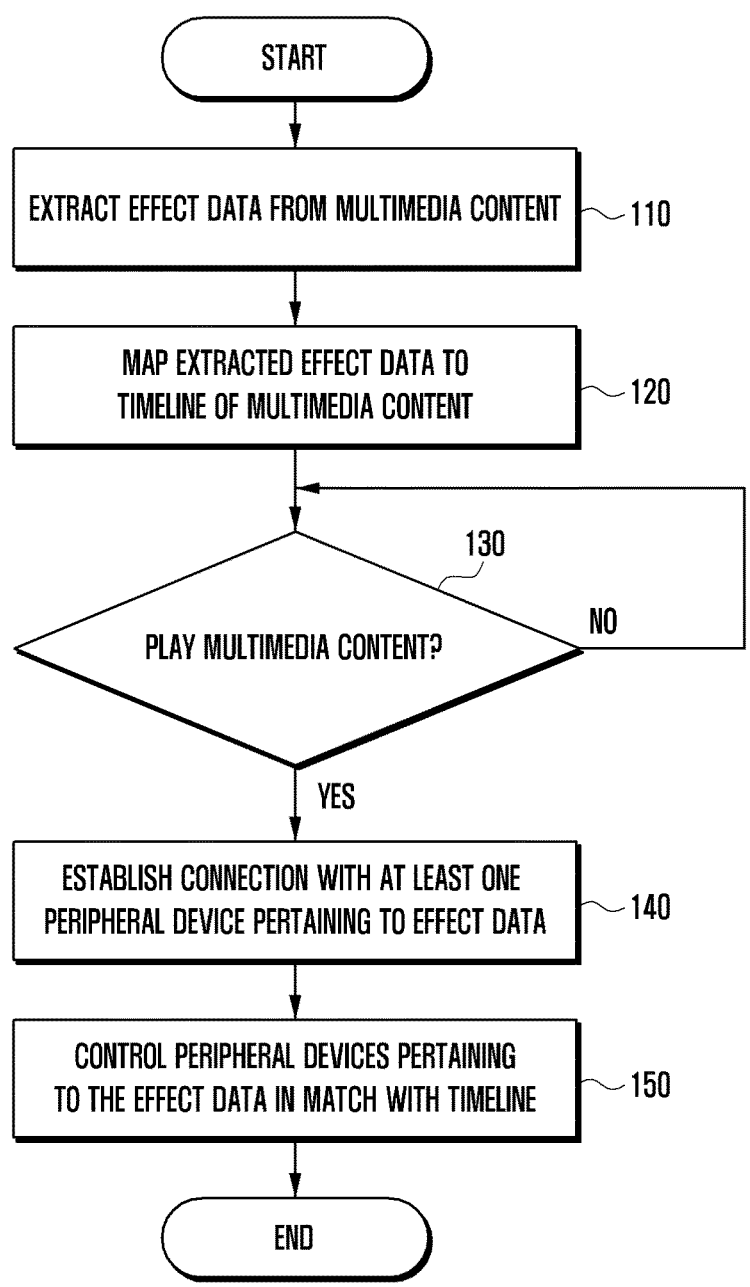
FIG. 1 is a flowchart illustrating a tangible multimedia content playback method according to an embodiment of the present invention.

Various embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention. This aims to omit unnecessary description so as to make the subject matter of the present invention clear.

A tangible multimedia content playback apparatus according to an embodiment of the present invention may be a part of an electronic device. The electronic device according to an embodiment of the present invention may have a communication function. Examples of the electronic device include a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical appliance, a camera, and a wearable device (e.g. electronic glasses, a head-mounted-device (HMD), an electronic clothing, an electronic bracelet, an electronic necklace, an electronic appcessory, an electronic tattoo, and a smartwatch).

According to an embodiment of the present invention, the electronic device may be a smart home appliance having a communication function. Examples of the smart home appliance include a television, a Digital Video Disk (DVD) player, an audio system, a refrigerator, an air conditioner, a vacuum cleaner, an electric range, a microwave oven, a laundry machine, an air cleaner, a set-top box, a game console, an electronic dictionary, an electronic key, a camcorder, and an electronic frame.

According to an embodiment of the present invention, examples of the electronic device include a medical apparatus (such as Magnetic Resonance Angiography (MRA), Magnetic Resonance Imaging (MRI), Computed Tomography (CT), and Ultrasound imaging), a navigation device, a Global Positioning System (GPS) receiver, an Event Data Recorder (EDR), a Flight Data Recorder (FDR), a car infotainment system, electronic equipment for ship (such as maritime navigation device and gyro compass), an aviation electronic device (avionics), a security device, an industrial, and a home robot.

According to an embodiment of the present invention, examples of the electronic device include furniture or part of a building/structure which has a communication function, an electronic board, an electronic signature receiving device, a projector, and a metering device (such as water, power, gas, and electric wave measurement device). The electronic device according to an embodiment of the present invention may be any or a combination of the above-described devices. It is obvious to those in the art that the electronic device is not limited to the above-enumerated devices.

An aspect of the present invention aims to provide a tangible multimedia content playback method and apparatus of allowing the user to experience the real environmental effect as in the 4D movie theater anytime anywhere using the peripheral devices providing the multimedia content with effect data.

FIG. 1 is a flowchart illustrating a tangible multimedia content playback method according to an embodiment of the present invention. The tangible multimedia content playback method according to an embodiment of the present invention may be executed by a tangible multimedia content playback apparatus (hereinafter, referred to as "playback apparatus").

Referring to FIG. 1, a control unit of the playback apparatus extracts effect data from the multimedia content at step 110. The multimedia content is the data or content including at least one of a video, an audio, a text, a motion picture, a movie, and broadcast. The playback apparatus may extract the content data from the multimedia content received in the form of streaming or being downloaded. The effect data provides an environment similar to that of the scene included in the multimedia content. For example, the effect data is the data which make it possible for the user to experience with five senses, i.e., sight, hearing, touch, smell, and taste.

The control unit maps the extracted effect data to the timeline of the multimedia content at step 120. The multimedia content includes a timeline (time information) on which the scenes reside. In order to provide the effect data in match with the scenes, the control unit maps the effect data to the timeline. The control unit may store the effect data mapped to the timeline in the storage dependently or independently on the multimedia content.

The control unit determines whether to play the multimedia content at step 130. For example, if the multimedia content is selected by the user, the control unit may determine the act of selecting as the request for playback of the selected content.

A communication unit of the tangible multimedia content playback apparatus establishes a connection with at least one peripheral device associated with the effect data at step 140. The peripheral device may be any of the devices related to the effect data. Examples of the peripheral device include an electric fan, an air conditioner, a heater, a radio, a speaker, a mobile terminal, a lighting device, a television, a tablet PC, and a desktop PC. Example of the peripheral device may further include a refrigerator, a laundry machine, a printer, a clock, a vacuum cleaner, a set-top box, a bus, a car, and a door lock.

The communication unit may establish connections with the peripheral devices before or after the playback of the multimedia content or before the effect data being provided. The communication unit receives device information from the peripheral devices for use in configuring communication protocols with the peripheral devices. The communication unit may configure the communication protocol with the peripheral devices in the same or different manner.

The control unit controls the operation of the peripheral devices associated with the effect data mapped to the timeline at step 150. For example, if the effect data is about wind, the control unit may control the electric fan to generate wind. If the effect data is about a temperature of 10 degrees, the control unit may control the air conditioner to adjust the temperature to 10 degrees.

In this way, the tangible multimedia content playback method and apparatus of the present invention augments reality so that a sensible effect is provided by the multimedia content.

Figure 2A:
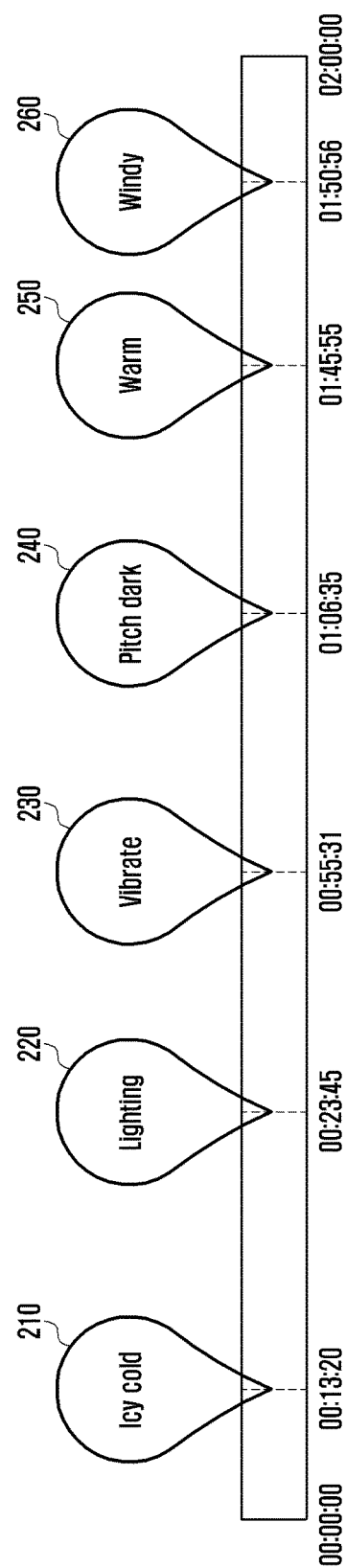

FIGS. 2A and 2B are diagrams for explaining extraction of effect data in the tangible multimedia content playback method according to an embodiment of the present invention.

Referring to FIG. 2A, the playback apparatus extracts the effect data from at least one of an image, a sound, a sound effect, and a speech included in the multimedia content. For example, the effect data is associated with a temperature ('Icy cold' 210 and 'Warm' 250), rain, wind ('Windy' 260), lighting 220, a vibration 230, and brightness ('Pitch dark' 240).

The playback apparatus maps the extracted effect data to the timeline of the multimedia content. For example, the effect data 'Icy cold' 210 is mapped to 00:13:20, 'Lighting' 220 to 00:23:45, 'Vibrate' 230 to 00:55:31, 'Pitch dark' 240 to 01:06:35, 'Warm' 250 to 01:45:55, and 'Windy' 260 to 01:50:56 on the timeline.

If it is impossible to extract any effect data from the multimedia content, the playback apparatus may generate effect data based on one of an image, a sound, a sound effect, a subtitle, a speech, and metadata. The playback apparatus may inquire about a scene of the multimedia content in order for the user to enter the effect data associated with the inquired scene.

Referring to FIG. 2B, the effect data is written in an eXtensible Markup Language (XML). The effect data may also be written in a Name-Value Pair or World Wide Web Consortium (W3C) Resource Description Framework (RDF)/XML format. The playback apparatus may insert the effect data into the multimedia content or store the effect data as a file separated from the multimedia content depending on the format of the multimedia data. For example, in order to store the effect data as a file separated from the multimedia content, the playback apparatus may add the file name or title of the multimedia content to the effect data.

In the effect data, "stream" denotes the stream to which the effect data is applied. For example, the playback apparatus identifies the stream to which the effect data is applied among a plurality of streams constituting the multimedia content based on "identifier (ID) attribute". When generating the effect data as a separate file, the playback apparatus may present the effect data with its title other than the ID.

In the effect data, "effect" defines when, what, and how effect is applied. The "effect" may be an interactive type or unidirectional type. In the case of the interactive type, "sending_signal" and "receiving_signal" may be defined to implement the effect. In the case of the unidirectional type, only the unidirectional "sending_signal" may be defined. In the case of the interactive type, the connections are established among the peripheral devices, as well as between the playback apparatus and the peripheral devices. In the case of the unidirectional type, the connections are established only between the playback apparatus and the peripheral devices.

In the effect data, "start_time" and "end_time" denotes the start and end time points of the defined effect in association with the stream on the timeline. The timeline is used for synchronization between the multimedia content and the effect data.

In the effect data, "service" denotes the service to be used for the effect. For example, the playback apparatus may define "service" as transmitting a text message to a mobile terminal from one of the peripheral devices and checking whether the user of the mobile terminal reads the message using the telephony service, which is a standard service of the Universal Plug and Play (UPnP) Forum, in the effect data. The playback apparatus connects to the network for providing the defined service, searches for the peripheral device providing the corresponding service, and exchanges messages with the found peripheral device to control the peripheral device, thereby outputs the effect by means of the peripheral device. The playback apparatus waits a response signal from the peripheral device in the maximum waiting time ("max_waiting_time") to establish a connection with the peripheral device which transmits a response signal within the maximum waiting time.

In the effect data, "av_control" defines the video/audio playback control at the same time with the control of "service." For example, the "av_control may be defined in the effect data such that the playback apparatus transitions to a "PAUSE" state in the middle of controlling the service and plays a specific audio and caption stream in the "PAUSE" state. If the service has completed or the maximum waiting time has elapsed, the playback apparatus transitions to a state designated by "next_state."

Figure 3:
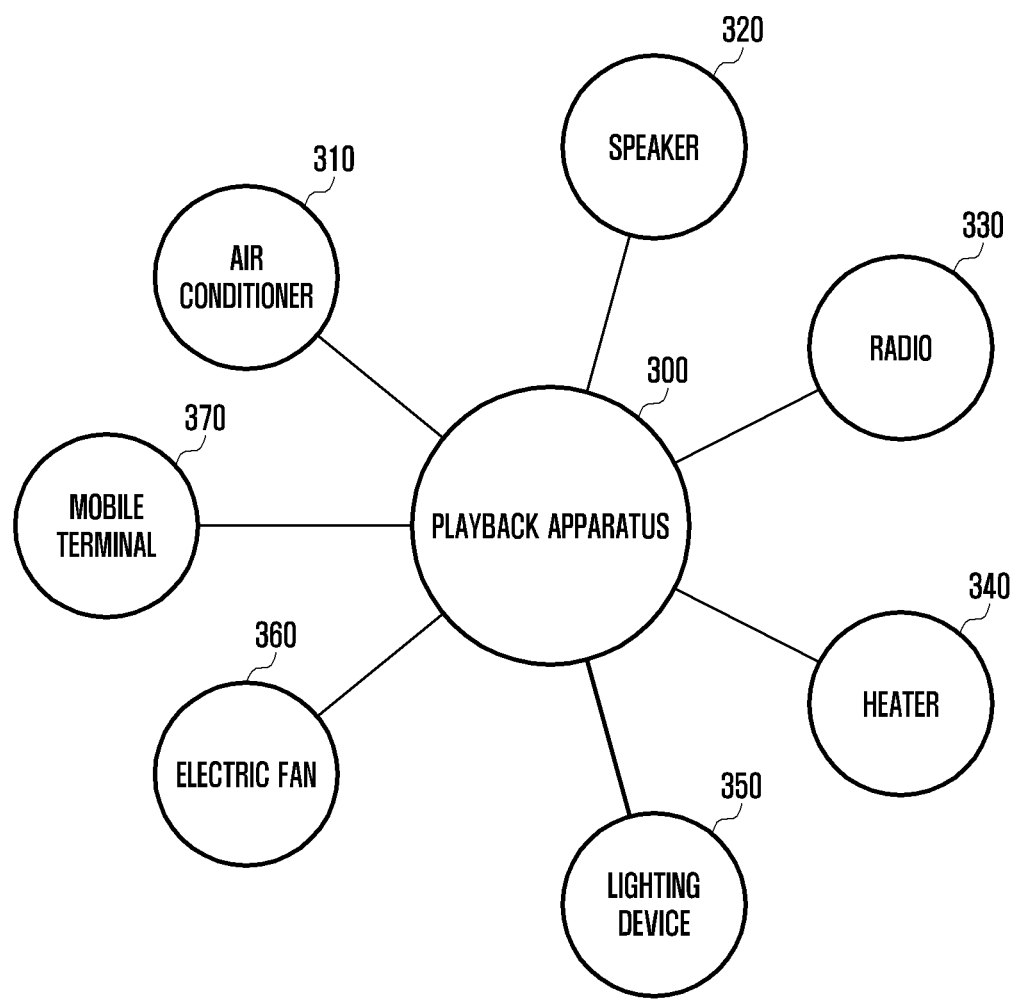
FIG. 3 illustrates an example of a situation in which a playback apparatus connects to a plurality of peripheral devices providing effects according to an embodiment of the present invention.

FIG. 3 illustrates a situation in which the playback apparatus connects to a plurality of peripheral devices providing effects according to an embodiment of the present invention.

As shown in FIG. 3, the playback apparatus 300 connects to any type of peripheral devices capable of augmenting reality in association with the effect data. The peripheral devices include an air conditioner 310, a speaker 320, a radio 330, a heater 340, a lighting device 350, an electric fan 360, and a mobile terminal 370. The peripheral devices may further include a television, a table PC, and a desktop PC, a refrigerator, a laundry machine, a printer, a clock, a vacuum cleaner, a set-top box, a bus, a car, and a door lock.

Figure 4:
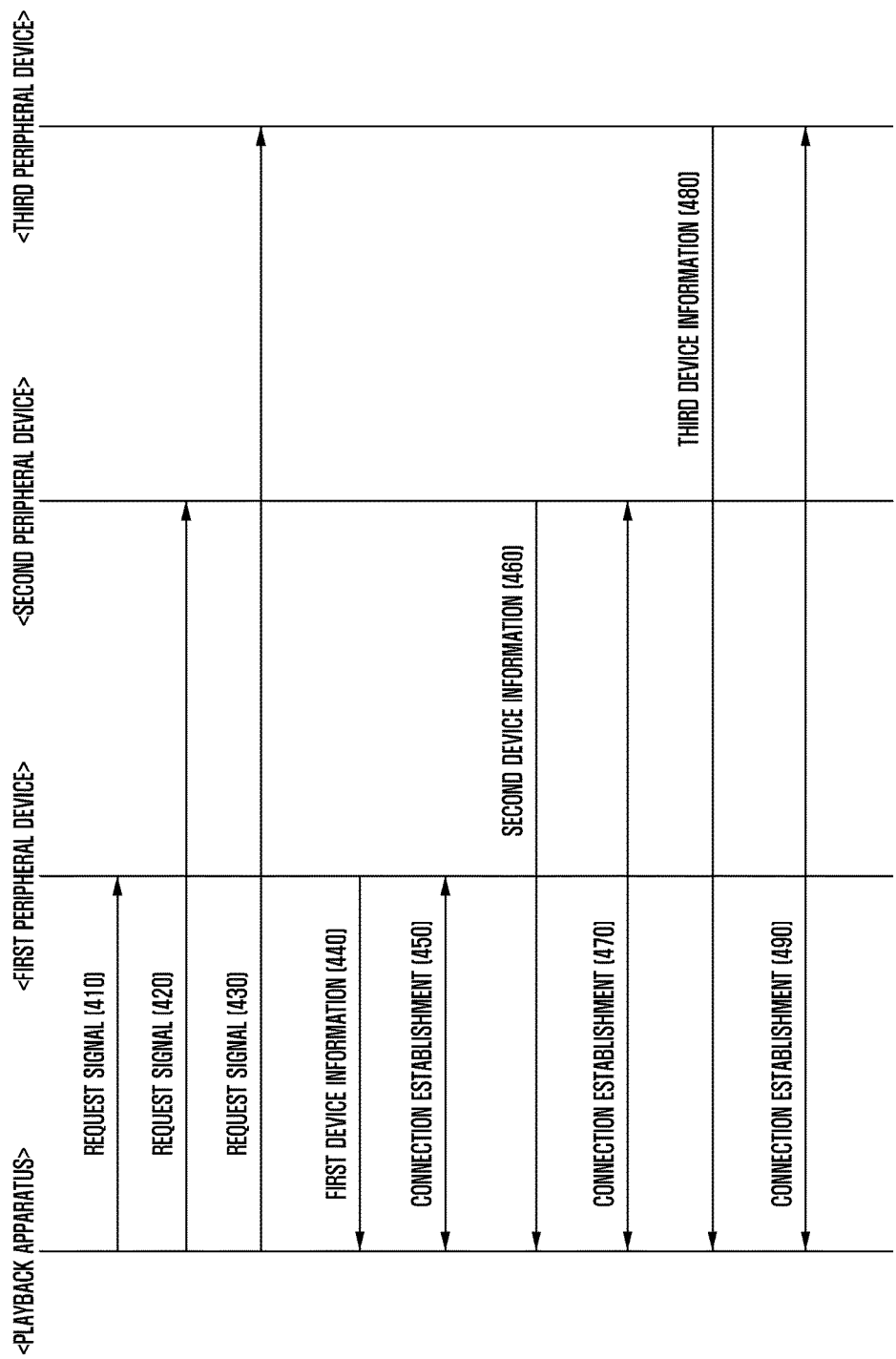
FIG. 4 is a signal flow diagram illustrating a procedure of establishing connections between a playback apparatus and peripheral devices according to an embodiment of the present invention.

FIG. 4 is a signal flow diagram illustrating a procedure of establishing connections between the playback apparatus and the peripheral devices according to an embodiment of the present invention.

Referring to FIG. 4, the playback apparatus searches for at least one peripheral device associated with the effect data and sends a request signal to the found peripheral devices. For example, the playback apparatus transmits the request signal to the first, second, and third peripheral devices at steps 410, 420, and 430, respectively. Although it is depicted that the request signal is transmitted to the peripheral devices in a chronological order, the playback apparatus may transmit the request signal to the peripheral devices at the same time or whenever a peripheral device is found in real time.

Upon receiving the request signal, the first peripheral device sends the playback apparatus the first device information at step 440. Upon receiving the first device information, the playback apparatus establishes a connection with the first peripheral device for communication at step 450.

Upon receiving the request signal, the second peripheral device sends the playback apparatus the second device information at step 460. Upon receiving the second device information, the playback apparatus establishes a connection with the second peripheral device for communication at step 470.

Upon receiving the request signal, the third peripheral device sends the playback apparatus the third device information at step 480. Upon receiving the third device information, the playback apparatus establishes a connection with the third peripheral device for communication at step 490.

Here, the device information is the information indicating the state of the peripheral device which includes at least one of a supportable communication protocol, a power status, a location, a device identity number, and a name. The playback apparatus may communicate with each peripheral device based on the device information.

According to an embodiment of the present invention, the playback apparatus may establish the connection with the respective peripheral device through the same communication protocol. For example, the playback apparatus may establish connections with the first, second, and third peripheral devices through one of communication protocols of Wi-Fi, Bluetooth, and Near Field Communication (NFC). Alternatively, the playback apparatus may establish the connections with the peripheral devices through different communication protocols. For example, the playback apparatus establishes a connection with the first peripheral device through the Wi-Fi communication protocol, establishes a connection with the second peripheral device through the Bluetooth communication protocol, and establishes a connection with the third peripheral device through the NFC communication protocol.

Although it is depicted that the time when the first, second, and third peripheral devices transmit the device information and the playback apparatus establishes connections with the first, second, and third peripheral devices differs from one another, the playback apparatus may transmit the device information and establish the connection with the first, second, and third peripheral devices at the same time or whenever the device information is received in real time.

According to an embodiment of the present invention, the playback apparatus controls such that the connected peripheral devices exchange the device information to establish connections therebetween based on the device information. For example, the playback apparatus may control the first peripheral device to transmit the first device information to the second and third peripheral devices, the second peripheral device to transmit the second device information to the first and third peripheral devices, and the third peripheral device to transmit the third device information to the first and second devices such that the first, second, and third peripheral devices establish connections therebetween.

The peripheral devices exchange their device information to establish connections therebetween. For example, the first peripheral device transmits the first device information to the second and third peripheral devices, the second peripheral device transmits the second device information to the first and third peripheral devices, and the third peripheral device transmits the third device information to the first and second peripheral devices so as to establish connections among the first, second, and third peripheral devices.

Figure 5:
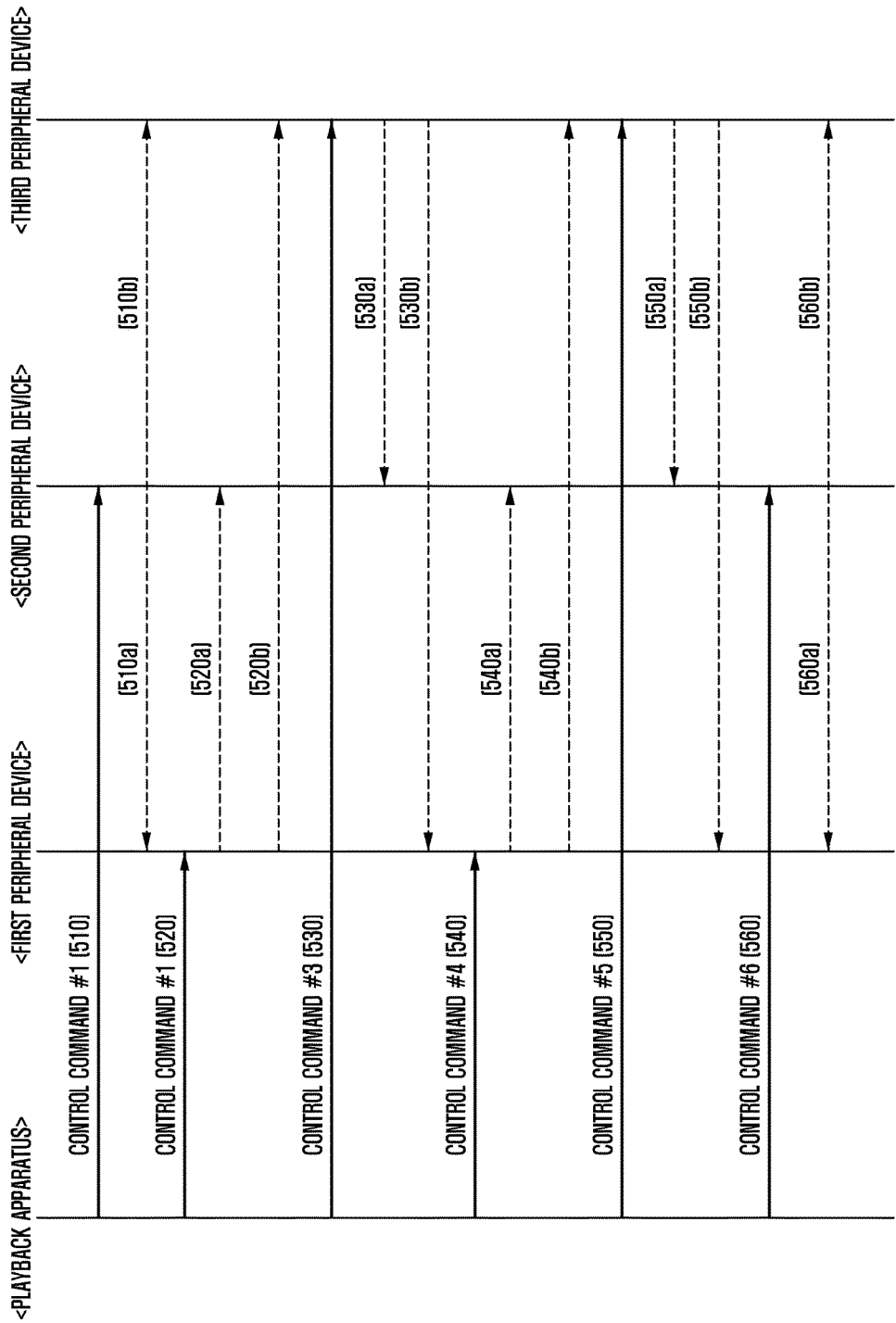
FIG. 5 is a signal flow diagram illustrating a procedure of controlling peripheral devices associated with effect data according to an embodiment of the present invention.

FIG. 5 is a signal flow diagram illustrating a procedure of controlling the peripheral devices associated with the effect data according to an embodiment of the present invention.

Referring to FIGS. 2A and 5, a playback apparatus may control the peripheral devices associated with the effect data in match with the timeline of the multimedia content. For example, the playback apparatus sends, to the second peripheral device, the control command #1 at 00:13:20 on the timeline to provide the effect data 'Icy cold' at step 510. At this time, the second peripheral device may be the air conditioner. When the second peripheral device is connected to the first and third peripheral devices, the second peripheral device may send the control command pertaining to the effect data 'Icy cold' to the first and third peripheral devices at steps 510a and 510b. When the first and third peripheral devices are capable of providing the effect associated with the 'Icy cold', the playback apparatus may control the second peripheral device to transmit the command pertaining to 'Icy cold' to the first and third peripheral devices.

The playback apparatus sends, to the first peripheral device, the control command #2 at 00:23:45 on the timeline to provide the effect data 'Lighting' at step 520. Here, the first peripheral device may be a lighting device. When the first peripheral device is connected to the second and third peripheral devices, the first peripheral device may send the control command pertaining to 'Lighting' to the second and third peripheral devices at steps 520a and 520b. When the second and third peripheral devices are capable of providing the effect associated with the 'Lighting', the playback apparatus may control the first peripheral device to transmit the command pertaining to 'Lighting' to the second and third peripheral devices.

The playback apparatus sends, to the third peripheral device, the control command #3 at 00:55:31 on the timeline to provide the effect data 'Vibrate' at step 530. Here, the third peripheral device may be a mobile terminal. When the third peripheral device is connected with the first and second peripheral devices, the third peripheral device may send the control command pertaining to 'Vibrate' to the first and second peripheral devices at step 530a and 530b. When the first and second peripheral devices are capable of providing the effect associated with the 'Vibrate', the playback apparatus may control the third peripheral device to transmit the command pertaining to 'Vibrate' to the first and second peripheral devices.

The playback apparatus sends, to the first peripheral device, the control command #4 at 01:06:35 on the timeline to provide the effect data 'Pitch dark' at step 540. Here, the first peripheral device may be a lighting device. The first peripheral device may send the control command pertaining to 'Pitch dark' to the second and third peripheral devices at steps 540a and 540b.

The playback apparatus sends, to the third peripheral device, the control command #5 at 01:45:55 on the timeline to provide the effect data 'Warm' at step 550. Here, the third peripheral device may be a heater. The third peripheral device may send the control command pertaining to 'Warm' to the first and second peripheral devices at steps 550a and 550b.

The playback apparatus sends, to the second peripheral device, the control command #6 at 01:50:56 on the timeline to provide the effect data 'Windy' at step 560. Here, the second peripheral device may be a heater or an air conditioner. The second peripheral device may send the control command pertaining to 'Windy' to the first and third peripheral devices at step 560a and 560b.

According to another embodiment of the present invention, the playback apparatus may configure priorities based on at least one of the characteristic of the effect data and locations of the peripheral devices and send, to the peripheral devices, the control commands corresponding to the effect data. In this case, the first peripheral device with the highest priority may cooperate with the second peripheral device to create the environment matching the effect data.

Figure 6:
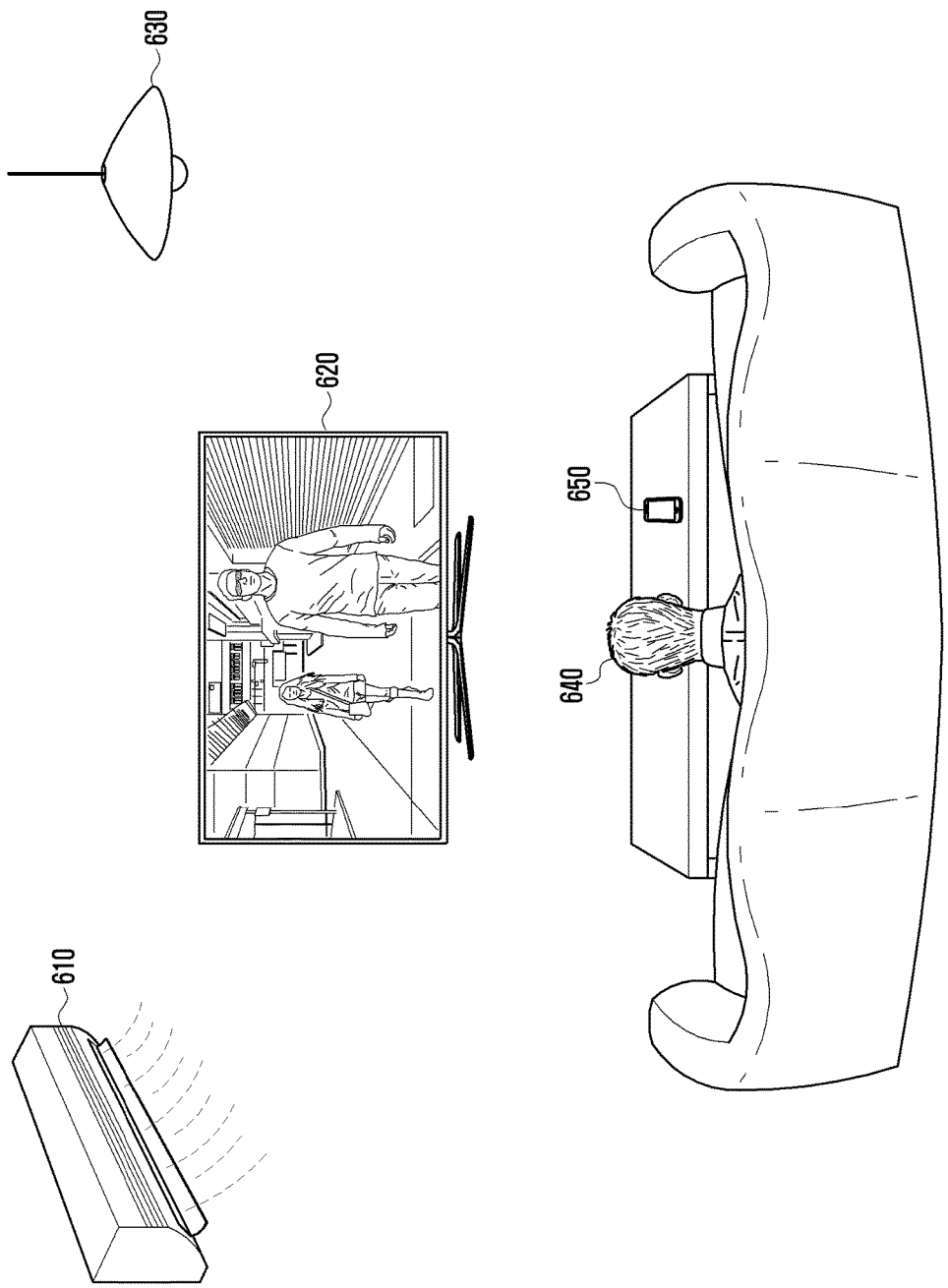
FIG. 6 illustrates an example of a situation of controlling peripheral devices associated with effect data according to an embodiment of the present invention.

FIG. 6 illustrates a situation of controlling the peripheral devices associated with the effect data according to an embodiment of the present invention.

Referring to FIG. 6, the television includes a playback apparatus for playing the multimedia content. The playback apparatus 620 configures priorities based on the characteristics of the effect data and locations of the peripheral devices 610, 630, and 650, and sends control commands, which are specific to the effect data, including the priorities, to the peripheral devices 610, 630, and 650. For example, the playback apparatus 620 configures the priorities in the order of the mobile terminal 650, the air conditioner 610, and the lighting device 630. In this case, the mobile terminal 650 with the highest priority may cooperate with the air conditioner 610 and the lighting device 630 to create the environment corresponding to the effect data.

The characteristic of the effect data relates to senses, and the playback apparatus 620 may allocate a high priority to the peripheral device pertaining to the effect that is most sensible among the five senses (sight, hearing, touch, smell, and taste). The location of the peripheral device denotes the distance from the user to the peripheral device, and the playback apparatus 620 may allocate the highest priority to the peripheral device closest to the user.

According to another embodiment of the present invention, the playback apparatus may configure the control priorities based on the characteristics of the effect data or the locations of the peripheral devices and sends the peripheral devices the control commands corresponding to the effect data in the order of the control priorities. That is, if the peripheral devices are not connected with one another or if it is necessary to transmit one control command to at least two peripheral devices, the playback apparatus may transmit the control command to the peripheral devices in the order of the control priorities. For example, the playback apparatus 620 allocates the control priorities in the order of the mobile terminal 650, air conditioner 610, and lighting device 630, and then transmits the control command to the peripheral devices in the order of the control priorities.

In this way, the tangible multimedia content playback method enables a user's experience to be maximized with the multimedia content.

According to another embodiment of the present invention, the playback apparatus may control playback of the multimedia content based on at least one of a predetermined event, a user's sight, peripheral device information, and a characteristic of the display unit.

For example, if there is an incoming call at the mobile terminal, which is a peripheral device, or if the user makes an outgoing call using the mobile terminal, the playback apparatus may control the playback of the multimedia content to pause or mute the volume of the speaker, which is a peripheral device. Also, if the user's sight is distracted from the display unit displaying the multimedia content, if the user's line of sight is out of the viewing angle of the display unit, if the user's line of sight is on the screen of the mobile terminal, which is a peripheral device, the playback apparatus may control the playback of the multimedia content to pause. The playback apparatus may determine whether an event occurring at one of a Bluetooth module, a GPS module, a Wi-Fi module, a sensor module, and a camera module matches one of predetermined events.

When the multimedia content is played on multiple display units, the playback apparatus may control the display units to display the subtitle in different languages respectively. For example, when a plurality of users watch the multimedia content using a plurality of display unit respectively, some users need the subtitles while others do not. The users may need the subtitle in different languages. The playback apparatus may control such that the subtitle in different languages are presented on the different display units other than on one display screen. For example, when the first user wears a Head-Mounted Display (HMD), the playback apparatus may control such that the HMD displays the subtitle in a language suited for the first user or provides the subtitle in an interpreted language. In this case, other users who do not need any subtitle may watch the multimedia content without any subtitle.

According to another embodiment of the present invention, the playback apparatus may transmit a message to a predetermined peripheral device based on at least one of a character, a scene, and an event in the multimedia content and control the playback of the multimedia content depending on whether the message is acknowledged.

Figure 7:
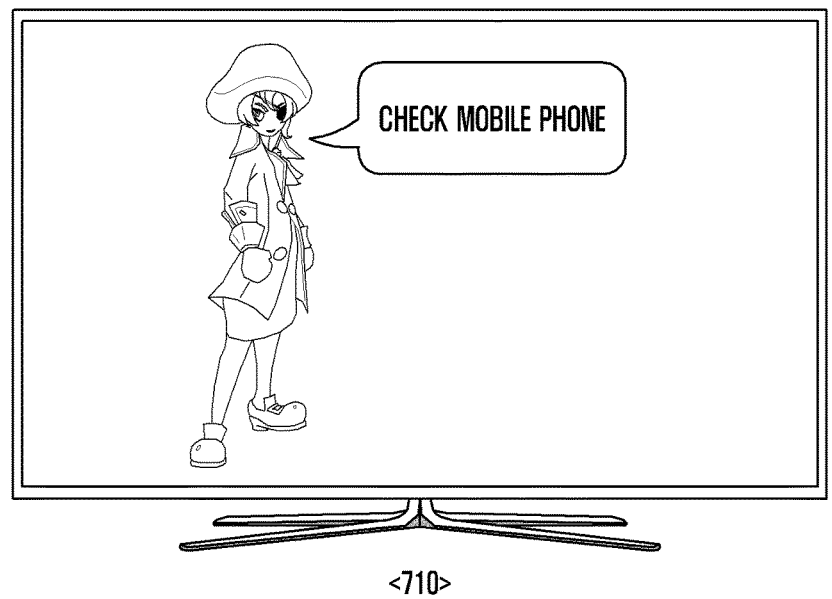
FIG. 7 illustrates examples of display screens for explaining multimedia content playback control depending on whether a user participates according to an embodiment of the present invention.
Figure 7:
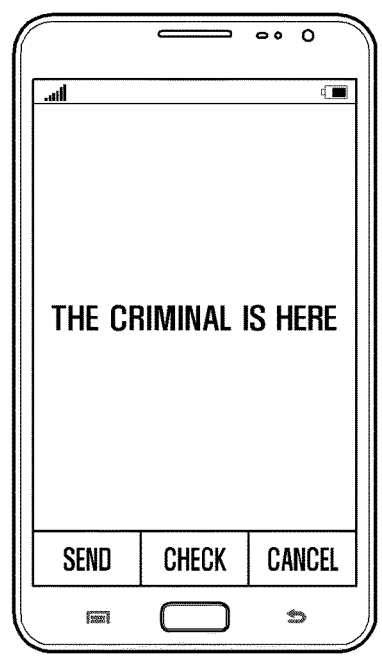

FIG. 7 illustrates examples of display screens for explaining multimedia content playback control depending on whether a user participates according to an embodiment of the present invention.

Referring to FIG. 7, the multimedia content may be created in a first person's point of view. In this case, the first person may interact with other characters, scenes, and events in the multimedia content. For example, the multimedia content has a scene 710 in which a captain character speaks "check the mobile phone". In this case, the playback apparatus sends a message 720 to the mobile terminal, which is a peripheral device. If the user does not check the message 720, the playback apparatus plays the scene 710 repeatedly. If the user checks the message 720, the playback apparatus stops repeating the playback of the scene 710 and plays the next scene.

Figure 8:
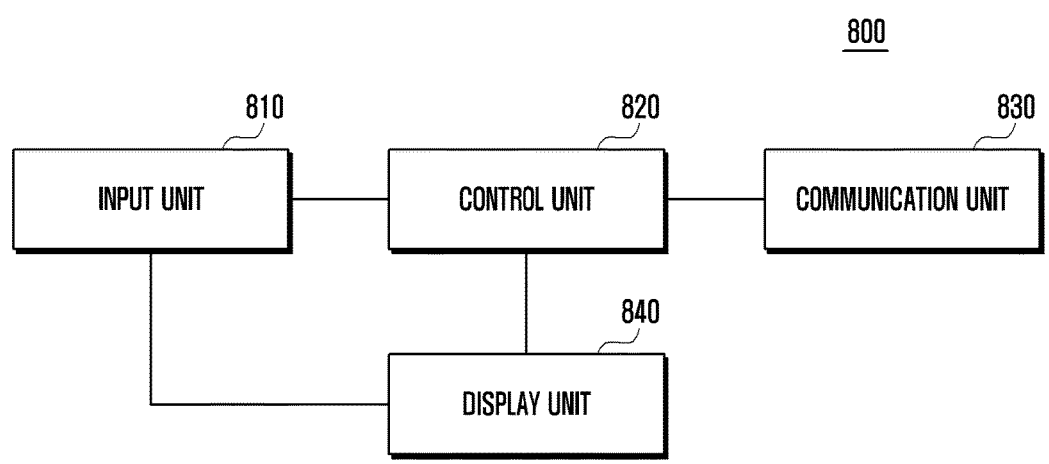
FIG. 8 is a block diagram illustrating a configuration of a tangible multimedia content playback apparatus according to an embodiment of the present invention.

FIG. 8 is a block diagram illustrating a configuration of the tangible multimedia content playback apparatus according to an embodiment of the present invention.

Referring to FIG. 8, the playback apparatus 800 includes an input unit 810, a control unit 820, and a communication unit 830. The playback apparatus 800 may further include a display unit 840.

The control unit 820 extracts the effect data from the multimedia content. For example, the control unit 820 extracts at least one of an image, a sound, a sound effect, a subtitle, a speech, and metadata included in the multimedia content. The control unit 820 also generates the effect data using at least one of the image, the sound, the sound effect, the subtitle, the speech, and the metadata included in the multimedia content.

The input unit 810 receives an input of selecting the multimedia content, which means that the user wants to play the selected multimedia content. The input unit 810 may receive an input of the effect data by the user in association with an effect scene, which is selected from the multimedia content, recommended by the playback apparatus.

The communication unit 830 establishes a connection with the peripheral device, which is capable of providing the effect corresponding to the effect data mapped to the selected multimedia content. The peripheral device may be any of devices capable of creating the environment pertaining to the effect data. Examples of the peripheral device may include an electric fan, a air conditioner, a heater, a radio, a speaker, a mobile terminal, a lighting device, a television, a tablet PC, and a desktop computer. Examples of the peripheral device may further include a refrigerator, a laundry machine, a printer, a clock, a vacuum cleaner, a set-top box, a bus, a car, and a door lock.

According to an embodiment of the present invention, the communication unit 830 receives the device information from the peripheral devices and configures a communication scheme for the respective peripheral device based on the received device information. The device information may be display by the display unit 840, and the communication unit 830 establishes a connection with the peripheral devices according to the communication schemes selected by the user through the input unit 810. The communication unit 830 may establish the connections with the peripheral devices in the same communication scheme or different communication schemes.

The control unit 820 maps the effect data to the timeline of the multimedia content. The control unit controls the peripheral devices to establish connections and to produce effects corresponding to the effect data in match with the timeline during the playback of the multimedia content. For example, the control unit 820 sends a control command pertaining to the effect data 'wind' to the electric fan to generate wind. As another example, the control unit 820 sends a control command pertaining to the effect data 'temperature 10 degrees' to the air conditioner to adjust the temperature to 10 degrees.

According to an embodiment of the present invention, the control unit 820 controls such that the peripheral devices exchange the device information to establish connections therebetween based on the device information. For example, the control unit 820 controls such that the first peripheral device transmits the first device information to the second and third peripheral devices, the second peripheral device transmits the second device information to the first and third peripheral devices, and the third peripheral device transmits the third device information to the first and second peripheral devices to establish connections among the first, second, and third peripheral devices.

According to another embodiment of the present invention, the control unit 820 configures priorities based on the characteristics of the effect data and/or locations of the peripheral devices from the user and sends, to the peripheral devices, the control commands including the priorities in correspondence to the effect data. In this case, the peripheral device with the highest priority may cooperate with the other peripheral devices to create the environment corresponding to the effect data.

The playback apparatus 800 may further include at least one of a Bluetooth module, a GPS module, a Wi-Fi module, a sensor module, and a camera module. The control unit 820 detects the location of the peripheral device in relation to the location of the user using at least one of the Bluetooth module, the GPS module, the Wi-Fi module, the sensor module, and the camera module.

According to an embodiment of the present invention, the control unit 820 configures the control priorities based on the characteristics of the effect data and the distances between the user and the peripheral devices and controls the communication unit 830 to transmit the control commands corresponding to the effect data to the peripheral device in the order of the control priorities.

According to an embodiment of the present invention, the control unit 820 controls the playback of the multimedia content based on at least one of a predetermined event, a user's line of sight, device information of the peripheral device, and a characteristic of the display unit. The control unit 820 determines whether a predetermined event occurs and/or whether the user's line of sight is distracted from the display unit 840 using at least one of the Bluetooth module, the GPS module, the Wi-Fi module, the sensor module, and the camera module.

According to an embodiment of the present invention, the control unit 820 sends, to the peripheral device, a message based on at least one of characters, scenes, and events included in the multimedia content and controls the playback of the multimedia content depending on whether the message is acknowledged.

According to an embodiment of the present invention, the playback apparatus is capable of controlling the peripheral device suited for providing the effects corresponding to the effect data of the multimedia content to create an environment similar to that can be created by the 4D movie theater, anytime, anywhere.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the spirit and scope of the invention as defined by the appended claims and their equivalents.

What is claimed is:

1. A tangible multimedia content playback method comprising:
   extracting real environmental effect data from multimedia content;
   mapping the extracted real environmental effect data to a timeline of the multimedia content;
   establishing, when the multimedia content is played, a connection to at least one peripheral device pertaining to the real environmental effect data; and
   controlling the at least one peripheral device pertaining to the real environmental effect data to match with the timeline,
   wherein controlling the at least one peripheral device comprises:
      configuring control priorities of the at least one peripheral device based on at least one of a characteristic of the real environmental effect data and a location of the at least one peripheral device; and
      transmitting control commands corresponding to the real environmental effect data to the at least one peripheral device in order of the control priorities.

2. The tangible multimedia content playback method of claim 1, wherein extracting the real environmental effect data comprises extracting the real environmental effect data from at least one of an image, a sound, a sound effect, a subtitle, a speech, and metadata.

3. The tangible multimedia content playback method of claim 1, wherein extracting the real environmental effect data comprises generating the real environmental effect data using at least one of an image, a sound, a sound effect, a subtitle, a speech, and metadata included in the multimedia content.

4. The tangible multimedia content playback method of claim 1, wherein extracting the real environmental effect data comprises:
   recommending an effect scene, which is selected from the multimedia content; and
   receiving an input of the real environmental effect data related to the recommended effect scene.

5. The tangible multimedia content playback method of claim 1, wherein establishing the connection comprises:
   receiving device information from the at least one peripheral device; and
   configuring a communication scheme with the at least one peripheral device based on the device information.

6. The tangible multimedia content playback method of claim 5, wherein establishing the connection further comprises:
   controlling peripheral devices to exchange the device information; and
   establishing connections among the peripheral devices.

7. The tangible multimedia content playback method of claim 1, wherein controlling the at least one peripheral device comprises:
   creating an environment corresponding to the real environmental effect data in cooperation with the at least one peripheral device.

8. The tangible multimedia content playback method of claim 1, wherein controlling the at least one peripheral device comprises playing the multimedia content based on at least one of a predetermined event, a user's line of sight, device information of the at least one peripheral device, and a characteristic of a display unit.

9. The tangible multimedia content playback method of claim 1, wherein controlling the at least one peripheral device comprises:
   transmitting a message to the at least one peripheral device preconfigured based on at least one of characters, scenes, and events included in the multimedia content; and
   controlling playback of the multimedia content depending on whether the message is acknowledged.

10. A tangible multimedia content playback apparatus comprising:
    an input unit configured to receive an input of multimedia content;
    a communication unit configured to establish a connection with peripheral devices providing effects corresponding to the real environmental effect data mapped to a selected multimedia content; and
    a control unit configured to establish connections among the peripheral devices and control the peripheral devices corresponding to the real environmental effect data to match with a timeline of the multimedia content,
    wherein the control unit is further configured to configure control priorities of the peripheral devices based on at least one of characteristics of the real environmental effect data and locations of the peripheral devices, and to control the communication unit to transmit control commands corresponding to the real environmental effect data to the peripheral devices in order of the control priorities.

11. The apparatus of claim 10, wherein the input unit is further configured to receive an input of the real environmental effect data pertaining to an effect scene, which is selected from the multimedia content.

12. The apparatus of claim 10, wherein the control unit is further configured to extract the real environmental effect data from at least one of an image, a sound, a sound effect, a subtitle, a speech, and metadata included in the multimedia content.

13. The apparatus of claim 10, wherein the communication unit is further configured to receive device information from the peripheral devices and configure communication schemes with the peripheral devices based on the received device information.

14. The apparatus of claim 13, wherein the control unit is further configured to control a display unit to display the device information, and to control the communication unit to establish connections with the peripheral devices through the communication schemes according to a user's selection through the input unit.

15. The apparatus of claim 10, wherein the control unit is further configured to create an environment corresponding to the real environmental effect data in cooperation with the peripheral devices.

16. The apparatus of claim 10, wherein the control unit is further configured to play the multimedia content based on at least one of a predetermined event, a user's line of sight, device information of the peripheral devices, and a characteristic of a display unit.

17. The apparatus of claim 10, wherein the control unit is further configured to control the communication unit to transmit a message to the peripheral devices preconfigured based on at least one of characters, scenes, and events, included in the multimedia content, and to control playback of the multimedia content depending on whether the message is acknowledged.

\* \* \* \* \*